Jan. 16, 1968     H. E. DE PENNING     3,363,537
COMBINATION TRACTOR EXHAUST PIPE COVER AND REFLECTOR
Filed Dec. 22, 1965
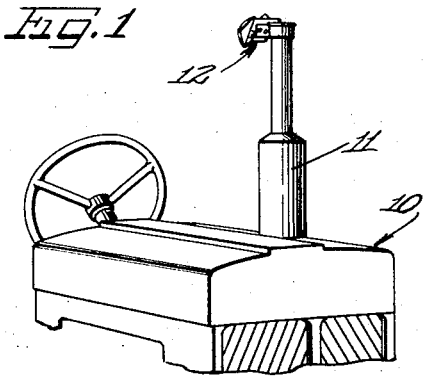
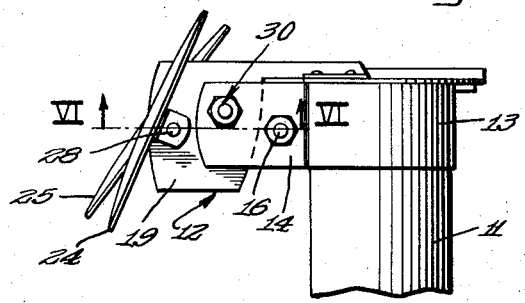
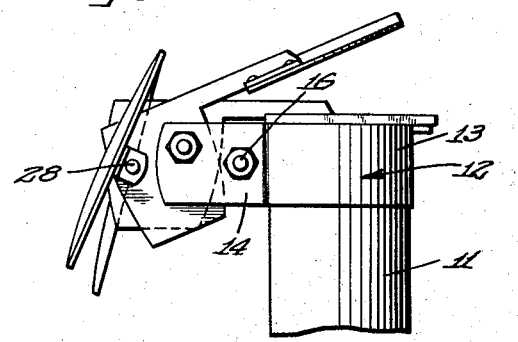
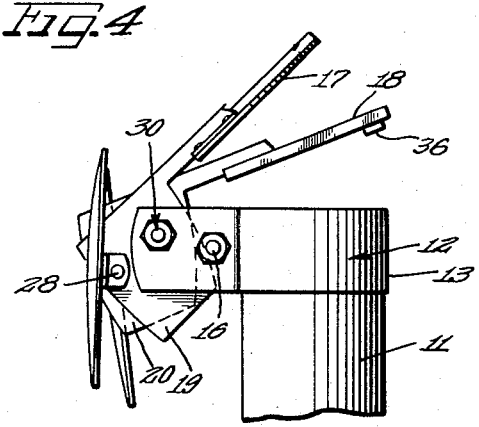
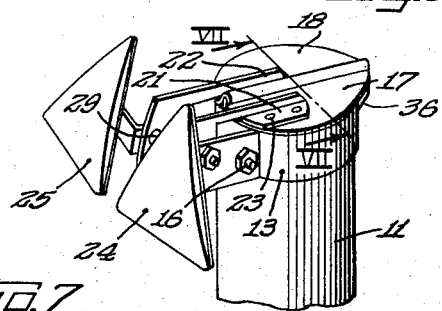
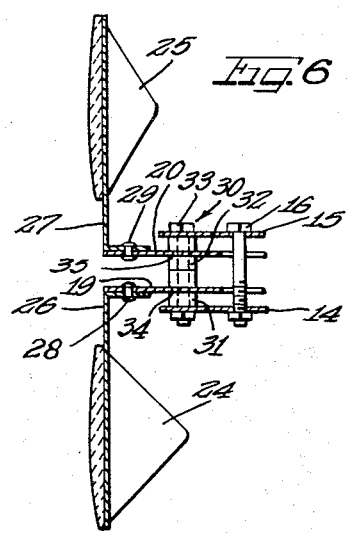
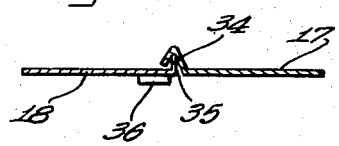
INVENTOR.
HAROLD E. DE PENNING
BY *Rudolph L. Powell*
ATTORNEY.

3,363,537
COMBINATION TRACTOR EXHAUST PIPE COVER AND REFLECTOR
Harold E. De Penning, Rte. 1, Reasnor, Iowa 50232
Filed Dec. 22, 1965, Ser. No. 515,622
2 Claims. (Cl. 98—59)

ABSTRACT OF THE DISCLOSURE

A cover structure for the exhaust pipe of a vehicle is operable to allow the escape of exhaust gases during vehicle operation and to prevent foreign objects or moisture from entering the exhaust pipe when the vehicle is idle. The structure includes a cover member comprised of two counterbalanced cover sections arranged in a side-by-side relation on the exhaust pipe, and pivotally supported at one of their corresponding ends for a relative pivotal or flutter type movement about a common axis in response to the discharge of exhaust gases from the exhaust pipe. The cover sections have the edges of their adjacent sides in an overlapping relation and are relatively weighted so that one cover section can move from a closed position in advance of the other cover section. Light reflector means on the respective counterbalances of the cover sections are faced in a direction to provide a movable signal warning to approaching vehicles.

---

The present invention relates generally to an exhaust pipe cover structure for use on a road vehicle such as a farm tractor and the like.

More particularly, the present invention relates to a new type of exhaust pipe cover having portions or halves which are relatively movable with respect to one another whereby the portions or halves are displaceable by exhaust pressures and are movable in a flutter type manner.

The present invention further relates to a new combination between an exhaust pipe cover having reflectors that are movable in response to the exhaust pressures enabling a flutter type movement of the cap portions of the reflectors.

In order to enable the reflectors to move independently of one another in accordance with certain features of this invention, the cover has been formed so as to comprise separate cover sections. Each of the cover sections has a counterbalancing flange and the reflector is attached thereto. The weight of each cover section is such that when the tractor motor is shut off the cover sections will normally be closed to exclude snow, dust, moisture, and the like from the exhaust pipe. When the motor is turned on exhaust pressures are developed sufficient to cause the cover sections to be displaced so that the exhaust gasses can escape to atmosphere. Since the cover sections are counterbalanced in such a way that the one cover section will be displaced prior to the other cover section, the reflectors can be fluttered or moved relative to one another to give a flashing type signal to a vehicle approaching from behind during the nighttime hours as the headlights of the approaching vehicle meet the reflectors.

According to certain features one of the halves is provided with a peak-shaped edge that overlaps an upright edge and an adjacent underlapped cover portion to provide a seal so that undesired materials cannot enter the exhaust pipe when the motor is turned off.

According to still further more specific features of this invention the counterbalancing flanges have pivot means for joining them to clamp flanges on a C-type clamp. A suitable fastener is provided on the C-clamp for joining the exhaust pipe cover structure to an exhaust pipe.

In order to facilitate manufacture pursuant to objects of this invention, the cover portions, the counter-balancing flanges, the clamp, and the reflector brackets can all be produced as stampings and these components can be conveniently assembled by suitable fasteners.

In view of the foregoing it will be appreciated that it is an important object of this invention to provide a combination reflector and exhaust pipe cover which cooperate together for providing means for warning vehicles approaching from the rear of a vehicle or tractor on which the inventive device is mounted and providing self-opening means for protecting the exhaust pipe.

Yet another object of this invention is to provide a reflector device mountable on an exhaust pipe for producing a flutter type reflective action.

Yet another object of this invention is to provide a combination reflector and exhaust pipe cover which can be economically manufactured and is of a simple construction for relatively repair-free operation.

Other objects and features of this invention will more fully become apparent in view of the following detailed description taken in conjunction with the accompanying drawings illustrating therein a single embodiment and in which:

FIGURE 1 is a fragmentary view of a tractor having an exhaust pipe cover structure mounted thereon in accordance with the present invention;

FIGURE 2 is a fragmentary side view of a cover structure mounted on an exhaust pipe illustrating the cover in a closed position;

FIGURE 3 is an enlarged fragmentary side view similar to FIGURE 2 but illustrating the overlapped cover section in an open position;

FIGURE 4 is an enlarged fragmentary side view similar to FIGURES 2 and 3 only with both cover sections illustrated in open positions;

FIGURE 5 is a perspective view of the cover structure shown in FIGURE 2;

FIGURE 6 is a horizontal section taken substantially on the line VI—VI as shown in FIGURE 2; and FIGURE 7 is a section of the cover taken substantially on the line VII—VII looking in the direction indicated by the arrows in FIGURE 5.

As shown on the drawings:

The reference numeral 10 indicates generally a tractor having an exhaust pipe 11 with a tractor exhaust pipe cover structure 12 carried thereon. The exhaust pipe cover structure embodies the significant features of the present invention.

This structure 12 includes split type C-shaped clamp 13 having clamp ends 14 and 15. These clamp ends can be secured together by a suitable fastener 16 such as a conventional type bolt and nut as illustrated. By securing the fastener 16, the clamp ends 14 and 15 can be drawn together to firmly attach the clamp 13 to the exhaust pipe 11.

The cover structure 12 further includes cover portions or halves 17 and 18. These cover portions 17 and 18 are joined to counterbalance flanges or portions 19 and 20. In order to minimize the manufacturing expense and so that the cover portions and the counterbalance flanges can be manufactured from stampings, the counterbalance flanges are provided with angular attachment flanges 21 and 22 which are adapted to be superimposed on top of the cover portions or halves 17 and 18 and riveted at 23 thereto.

A pair of reflectors 24 and 25 are mounted on reflector brackets 26 and 27 which brackets are in turn riveted at 28 and 29 to the counterbalance flanges 19 and 20. It will be seen from FIGURE 2 where the cover portions 17 and 18 are shown in a closed position that the reflectors 24 and 25 are mounted at different angles of inclination in order to be able to pick up light reflections from the headlights of a vehicle moving from behind the tractor toward the tractor. As illustrated, the reflectors are of a triangular configuration and can be of any suitable construction are here illustrated as comprising red colored glass.

Pivot means 30 is provided for supporting each of the cover portions 17 and 18 on the clamp 13. To this end, the pivot means 30 includes bearing sleeves 31 and 32 and a suitable nut and bolt fastener 33. Bearing holes 34 and 35 are provided in the counterbalance flanges 19 and 20 for receiving the bearing sleeves 31 and 32 so that the cover halves 17 and 18 can rock independently of one another on the associated bearing sleeves.

In order to prevent moisture, dirt and other undesirable particles from entering the exhaust pipe when the engine is turned off, the cover portions 17 and 18 are disposed in lapped relation along the line of juncture between them. More particularly, the overlapping cover portion 17 has an overlapped peak-shaped edge 34 while the underlapped upright edge 35 is engaged in the peak cavity as illustrated in FIGURE 7. In order to ensure that the cover halves or portions 17 and 18 will move relative to one another, a weight 36 is provided at an outer end of the cover portion or half 18 so that the cover portion or half 17 can be moved prior to the moving of the underlapping cover portion or half 18. It will be seen from FIGURE 4 that the weight 36 is positioned in such a way so as to lie exteriorly of the exhaust pipe when the cover portions 17 and 18 are disposed in a closed position.

Although minor modifications might be suggested by those versed in the art, it should be understood that I wish to embody within the scope of the patent warranted hereon, all such modifications as reasonably and properly come within the scope of my contribution to the art.

I claim:

1. In combination with an upright exhaust pipe of a vehicle engine, an automatic self-closing protective cover structure, comprising:

(a) a clamp means secured to and substantially encircling said exhaust pipe adjacent the discharge end thereof,
   (b) a cover member means for said discharge end including a pair of cover sections arranged in a side-by-side relation,
   (c) a counterbalance means for each of said cover sections projected from one of the corresponding ends of said cover sections,
   (d) means pivotally supporting said cover sections on said clamp means for relative pivotal movement about a common horizontal axis,
   (e) each of said counterbalance means being provided with a warning reflector surface faced in a direction to warn an approaching vehicle, and
   (f) said cover sections being relatively movable in response to the discharge of exhaust gases from said discharge end whereby said reflector surfaces produce a movable warning signal and relatively counterbalanced so that one cover section is moved upwardly from the discharge end of the exhaust pipe in advance of the other cover section.

2. An automatic self-closing protective cover structure according to claim 1, wherein:

(a) said cover sections have adjacent side portions, with the side portion on said one of the cover sections being in an overlapped relation with the side portion on the other of said cover sections.

References Cited

UNITED STATES PATENTS

| | | | |
|---|---|---|---|
| 1,985,880 | 1/1935 | Blommers | 98—59 X |
| 2,637,264 | 5/1953 | Harmon | 98—59 |
| 2,694,358 | 11/1954 | Taylor | 98—59 |
| 2,832,585 | 4/1958 | Hansen | 98—59 |
| 2,983,216 | 5/1961 | Stade et al. | 98—119 X |
| 3,274,917 | 9/1966 | Tolbert | 98—59 |

ROBERT A. O'LEARY, *Primary Examiner.*

M. A. ANTONAKAS, *Assistant Examiner.*